Figure 1:
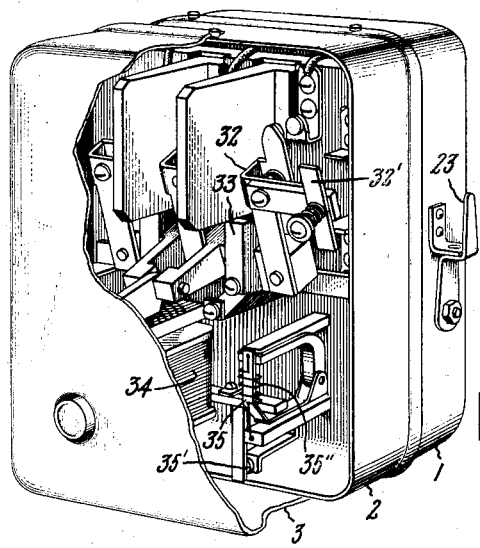

March 7, 1933.  L. J. WEBER  1,900,595

CIRCUIT CONTROLLING AND PROTECTIVE DEVICE

Filed March 18, 1930

Inventor:
Louis J. Weber,
by Charles E. Mullan
His Attorney

Patented Mar. 7, 1933

1,900,595

UNITED STATES PATENT OFFICE

LOUIS J. WEBER, OF SCHENECTADY, NEW YORK, ASSIGNOR TO GENERAL ELECTRIC COMPANY, A CORPORATION OF NEW YORK

CIRCUIT CONTROLLING AND PROTECTIVE DEVICE

Application filed March 18, 1930. Serial No. 436,869.

The invention relates to circuit controlling and protective devices and has for its principal object the provision of an improved form of safety circuit controlling and protective device, particularly adapted for the control of electric motors wherein remote control of the circuit, time element overload protection, short circuit protection, under voltage protection as well as direct manual disconnection and reconnection of the circuit may be obtained with all the circuit controlling and protective devices enclosed within a compact protecting casing and with the principal parts which are subject to failure, mounted as a readily removable unit.

The enclosed remotely controlled motor starting switches now on the market ordinarily are provided with only an overload protective relay having time element characteristics such as to take care of the excessive motor starting current without causing the motor circuit to be interrupted while protecting the motor against long continued overloads of a value slightly above the normal load current of the motor. With such devices provision must be made for some additional form of circuit protection such as a fuse or circuit breaker to take care of short circuits. Also from the standpoint of safety some form of disconnecting switch must be provided to isolate both the fuses and the motor control switch whenever repairs or replacements are to be made in order to prevent the danger of accidental contact of the repairman or operator with the live parts.

Moreover, when the motor and its control are used for operation of machinery where a shutdown for any considerable period of time due to some slight failure of the control is of serious consequence, it is quite desirable that provision be made for permitting the quick removal of the defective control apparatus and substitution therefor of a duplicate unit. With the ordinary form of motor control such a failure of the control would necessitate not only the disconnection from the control of the power conductors, the motor conductors, and the remote control conductors but also the dismounting of the switch mechanism from its enclosing casing together with the remounting of a new unit and the reconnection of the various conductors, all of which necessarily requires considerable time.

With the present invention, however, the difficulties noted above are effectively overcome by means of a combined circuit controlling and protective device of compact and unitary construction such that it may be mounted within an enclosing casing of relatively small dimensions which is of special sectionalized construction to allow the quick replacement of the main circuit controlling and protective switch mechanism.

In the preferred form of the invention, a permanently mounted panel upon which are placed the terminals for the power conductors and the terminals for the motor and control conductors together with special intermediate terminals, is arranged to be housed in one section of the enclosing casing having the usual knockout openings for the conductor conduits. A disconnecting switch mechanism also is mounted on the permanently mounted panel and connected between the power terminals and the intermediate terminals and arranged to be operated by a handle located outside of the enclosing casing. The electromagnetically operated motor circuit controlling switch, which is to be remotely controlled, together with the time element motor overload protective relays and short circuit protective fuses are mounted on a separately removable panel, which is provided with a plurality of special contacts which extend in abutting alignment with the intermediate terminals and the motor and control terminals on the permanently mounted panel when the two panels are mounted in opposing spaced relation. The removable panel is mounted in a separately removable section of the enclosing casing and provision is made for quickly mounting and dismounting the separately removable section. In addition a cover section, cooperating with the removable section of the casing, is provided for permitting inspection and adjustment of certain parts of the switch mechanism without requiring dismounting thereof. However, due to a special interlocking between sections of the enclosing casing, the short circuit protective fuses remain entirely enclosed until after the disconnecting switch is operated to isolate the intermediate terminals from the power lines. Only under these conditions can the main circuit controlling and protective panel be removed to permit the replacement of the fuses.

Figure 2:
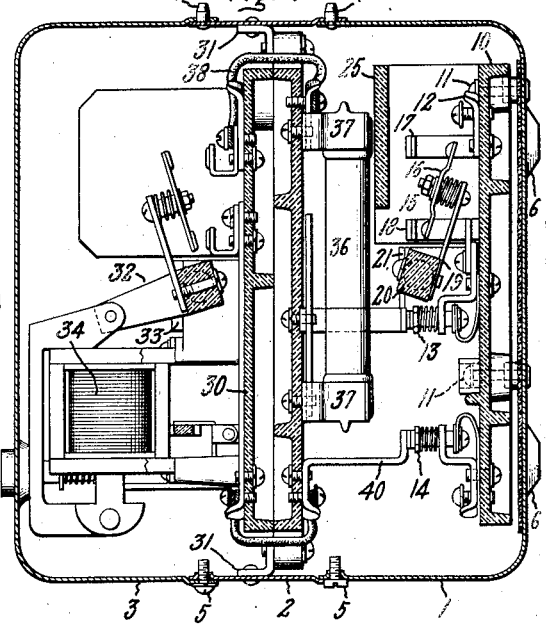
Figure 3:
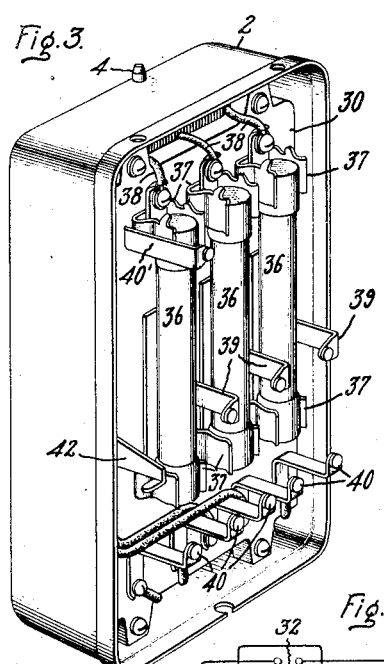
Figure 4:
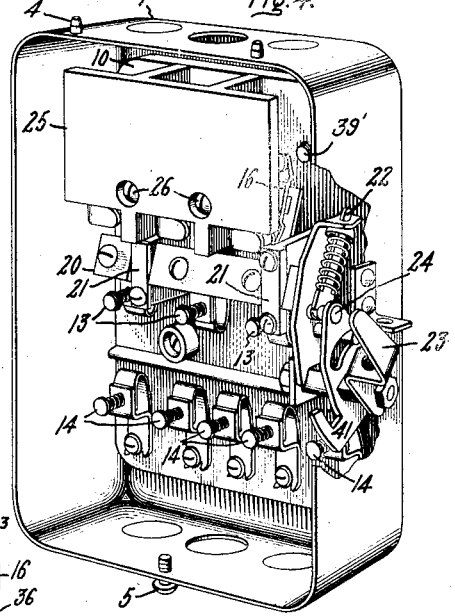
Figure 5:
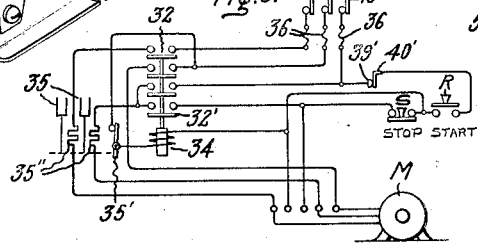

In the accompanying drawing, Fig. 1 is a perspective view of a combined circuit controlling and protective device embodying a preferred form of the invention with the portion of the sectionalized enclosing casing broken away to reveal the arrangement of the electromagnetically operated switch mechanism; Fig. 2 is a sectional view of the device more fully showing the permanently mounted terminal and a disconnecting switch panel and the removable main circuit controlling switch and protective fuse panel mounted in opposing spaced relation within the sectionalized enclosing casing; Fig. 3 is a perspective view of the rear of the main circuit controlling and protective panel mounted in the removable section of the enclosing casing; Fig. 4 is a perspective view of the terminal and disconnecting switch panel which is permanently mounted in the permanently mounted section of the enclosing casing; and Fig. 5 is a connection diagram showing the various circuits involved when the improved circuit controlling and protective device is used in motor control service.

As shown in Fig. 1 the enclosing casing for the circuit controlling and protective device is formed of the three sections, 1, 2 and 3 which are removably joined together by means of the pins 4 and the screws 5 to permit ready assembly and disassembly thereof. As shown more clearly in Fig. 2, the permanently mounted back section 1 of the enclosing casing is provided with projecting bosses 6 through which the holding screws or bolts pass when the casing is permanently mounted on a machine, wall, or other support. The panel 10, preferably of good insulating material, is permanently mounted within the back section 1 of the enclosing casing by means of the screws 11. For three phase alternating current service, the panel 10 has mounted thereon three terminals 12 having suitable binding screws for the power conductors which may be introduced into the enclosing casing through the knockout openings indicated in Fig. 4. The three special intermediate terminals 13 and the several terminals 14 and 39′ having suitable binding screws for the various motor and control conductors, are mounted on the panel 10 and are of the yielding spring pressed type to make abutting engagement with the contacts 39, 40 and 40′ extending from the removable panel 30 as indicated in the drawing.

The three phase disconnecting switch 15, comprising the bridging spring pressed contacts 16 and the cooperating stationary contacts 17 and 18 is interconnected between the power terminals 12 and the intermediate terminals 13. The disconnecting switch contacts 16 are mounted on the supports 19 carried by the rotatable shaft 20 which is mounted in the bearings 21. As more clearly shown in Fig. 4 the disconnecting switch shaft 20 carries a lever arm 22 which is operated by a handle 23 located outside of the enclosing casing through the agency of the snap action over center spring mechanism 24.

In order to prevent accidental contact with the power terminals 12 and also confine the arcing which may occur upon opening of the disconnecting switch under load, the barrier 25 formed of insulating and arc resisting material is mounted by means of the removable screws 26 on the panel 10 so as to substantially enclose the power terminals 12, and the contacts 17 of the disconnecting switch 15.

The middle removable section 2 of the enclosing casing carries the main control and the protective panel 30 mounted on the angle supports 31. On the front side of panel 30, the main three phase circuit controlling switch 32 is mounted in suitable bearings 33 and connected to be operated by the electromagnet 34 under remote push button control. This electromagnetically operating circuit controlling switch 32 is of substantially the same form as described and claimed in my Patent 1,742,109 of December 31, 1929 and hence need not be described in detail herein. Briefly, the operating electromagnet 34 provides for opening of the main circuit controlling switch 32 upon the occurrence of under voltage conditions and the thermal relays 35 function to provide time element overload circuit protection by interrupting the energizing circuit of the operating electromagnet 34.

On the rear of the main panel 30, the short circuit protective fuses 36 are removably mounted in the spaced apart clips 37. The upper fuse clips are connected by the conductors 38 to the upper stationary contacts of the main switch 32 and the bottom clips are connected to the contacts 39 which extend from the back of the main panel 30 in such spaced alignment as to engage with the three intermediate spring pressed butt contacts 13 on the panel 10 when the middle section of the enclosing casing is mounted in operating relation on the back section. The row of contacts 40 and contact 40′, which are electrically connected to the bottom stationary contacts of the main switch 32 and to the terminals on the operating electromagnet 34 as indicated in Fig. 5, are disposed in spaced relation to engage with the several spring pressed motor and control terminals 14 and 39′ on the panel 10 under similar conditions.

The interlocking member 41 is connected with the operating handle 23 and cooperates with the latch member 42 extending from the middle section 2 in such manner as to prevent the removal or remounting of the middle section when the disconnecting switch 15 is closed. With the disconnecting switch closed, the member 42 blocks the path of the latch member 41. Thus only when the disconnecting switch 15 is opened and the interlocking member 41 is in the position shown in Fig. 4, can the sections 1 and 2 of the enclosing casing be brought together or separated.

With the back section 1 permanently mounted and the removable sections 2 and 3 mounted in cooperating relation as shown in Fig. 1 and the various circuit controlling and protective devices interconnected electrically as shown in Fig. 5, the operation is as follows: Handle 23 must be operated to close the disconnecting switch 15 before the operating electromagnet 34 of the main switch may be energized. With the disconnecting switch closed, operation of the remotely located normally open starting push button R completes a circuit extending from the power conductor $L_3$ through the corresponding contact of the disconnecting switch, one of the fuses 36, the control contact 40' and spring pressed butt contact 39', the starting push button R and thence through the operating winding of the electromagnet 34, the contact 35' of the thermal time element overload protective relay 35 and the middle fuse and middle contact of the disconnecting switch to the power conductor $L_2$. The energization of the operating electromagnet 34 results in closure of the main circuit controlling switch 32 to energize the three phase motor M. The auxiliary contact 32' completes a holding circuit extending through the stop push button S independent of the starting push button R. The main motor circuit extends through the disconnecting switch 15, the fuses 36, the contacts of the main switch 32 and the heating elements 35'' of the overload relays.

In case of short circuits, the fuses 36 provide instantaneous protection while on normal motor overloads the thermo relays 35 provide time element protection for the motor circuit. In case of voltage failure, the operating electromagnet 34 is deenergized to permit the switch 32 to open and remain open until the start push button again is operated. In case of short circuit or other emergency to which the fuses 36 or the overload relays 35 fail immediately to respond, the circuit may be opened by manual operation of either the stop push button S or of the disconnecting switch handle 23.

When the fuses function to interrupt the circuit, it is only necessary to open the disconnecting switch, loosen the screw 5 and remove the middle section of the enclosing casing to permit quick renewal of the fuse. With the middle section thus removed, the fuses can be replaced with no danger to the operator of coming in contact with live parts. Moreover, in case of failure of any part of the main control switch 32 or its operating electromagnet 34, the middle section likewise may be removed and a spare unit quickly substituted.

From the foregoing it will be apparent that the combined circuit controlling and protective device of the present invention affords remote control of the motor circuit, complete protection of both the motor and the operator, as well as the advantages of ease in installation, elimination of all wiring operations between the component parts and the utmost accessibility for repairs and inspection.

What I claim as new and desire to secure by Letters Patent of the United States, is,—

1. An enclosed safety circuit control and protective device including in combination an enclosing casing formed by a back section, a middle section, and a cover, said sections and said cover being arranged to be removably assembled to each other in the relation specified, a panel mounted in the middle section of said casing so as to have one side adjacent said cover and its other side adjacent said back section, an electro-magnetically operated circuit breaker and a cooperating overload circuit protective means mounted on the side of said panel adjacent said cover, circuit protective fuses mounted on the other side of said panel adjacent said back section, a circuit disconnecting switch including cooperating stationary and movable contacts, supporting means mounting said switch in said back section, a plurality of contacts on said supporting means, a plurality of contacts on said panel arranged to cooperate with said first contacts when said middle section is in said predetermined assembled relation to complete circuits from said disconnecting switch to said fuses, operating means for said disconnecting switch carried by said back section, and interlocking means associated with said operating means for preventing the mounting or dismounting of said middle section with said back section when said disconnecting switch is closed.

2. An enclosed safety circuit control and protective device including in combination an enclosing casing formed by a back section, a middle section, and a cover, said sections and said cover being arranged to be removably assembled with each other in the relation specified, a panel mounted in said middle section so as to have one side adjacent said cover and its other side adjacent said back section, an electromagnetically operated circuit breaker and overload relay mounted on the side of said panel adjacent said cover, protective fuses mounted on the other side of said panel adjacent said back section, a circuit disconnecting switch, a panel located within said back section for supporting said disconnecting switch, an insulating barrier secured to said panel substantially enclosing said disconnecting switch to prevent engagement therewith when said intermediate section is removed, a plurality of contacts secured to each of said panels, said contacts on one panel being arranged for abutting engagement with contacts of said other panel when said middle section is in assembled relation with respect to said back section, an operating handle extending through said enclosing casing for said disconnecting switch, and interlocking means associated with said operating handle for preventing the assembly of said intermediate section with said back section when the disconnecting switch is closed.

3. A safety circuit control and protective device including in combination a panel, a circuit disconnecting switch mounted on said panel, a second panel, supporting means for each of said panels arranged to hold said panels in a predetermined spaced relation with each other, a remotely controlled electromagnetically operated circuit breaker and cooperating overload protective means mounted on one side of said second panel, protective fuses mounted on the other side of said second panel, abutment contacts on each of said panels for connecting said disconnecting switch to said fuses whenever said panels are in said predetermined spaced relation with each other, and abutment contacts on each of said panels for connecting said circuit breaker to said first panel.

4. An enclosed safety circuit control and protective device including in combination an enclosing casing formed by a back section, a middle section, and a cover, said sections and said cover being arranged to be removably assembled to each other in the relation specified, a panel in said back section, power supply terminals and intermediate terminals on said panel, and a circuit disconnecting switch mounted on said panel between said power terminals and said intermediate terminals, a second panel mounted in said middle section, protective fuses mounted on the side of said panel adjacent said back section, a plurality of contacts, means for supporting said contacts in spaced relation with said second panel, cooperating contacts supported from said first panel so that when said middle section is in assembled relation with respect to said back section said contacts on said panels connect said intermediate terminals to said fuses, an electromagnetically operated circuit breaker, and a cooperating overload circuit protective means mounted on the other side of said panel and adjacent said cover, and means for preventing the mounting or dismounting of said middle section with said back section when said disconnecting switch is closed.

5. An enclosed safety circuit control and protective device including in combination, an enclosing casing formed by a back section, a middle section, and a cover, said sections and said cover being arranged to be removably assembled with each other in the relation specified, a panel mounted in said middle section, an electromagnetically operated circuit breaker and overload relay mounted on one side of said panel, protective fuses mounted on the other side of said panel, a circuit disconnecting switch, a second panel located within said back section for supporting said switch, abutment contacts supported from said second panel and extending towards said first panel, cooperating resiliently mounted abutment contacts supported from said first panel for connecting said fuses, said circuit breaker and said overload relay to said back section when said sections are in assembled relation with each other, an operating handle extending through said enclosing casing for said disconnecting switch, and interlocking means associated with said operating handle for preventing the assembly of said intermediate section with said back section when said disconnecting switch is closed.

In witness whereof, I have hereunto set my hand this 17th day of March, 1930.

LOUIS J. WEBER.